United States Patent [19]

Sayles et al.

[11] Patent Number: 4,556,542
[45] Date of Patent: Dec. 3, 1985

[54] FCCU CATALYST-HIGH VELOCITY VAPOR SEPARATOR

[75] Inventors: Scott M. Sayles, Port Neches; Leonce F. Castagnos, Jr., Nederland, both of Tex.

[73] Assignee: Texaco Inc., White Plains, N.Y.

[21] Appl. No.: 616,639

[22] Filed: Jun. 4, 1984

[51] Int. Cl.⁴ .................. B01J 8/18; B01D 45/12
[52] U.S. Cl. .................................... 422/147; 55/343; 55/349; 55/457; 55/458
[58] Field of Search .............. 422/147; 208/161; 209/144; 55/343, 349, 435, 450, 456–458, 463

[56] References Cited

U.S. PATENT DOCUMENTS

| | | | |
|---|---|---|---|
| 3,546,854 | 12/1970 | Muller | 55/458 |
| 3,767,566 | 10/1973 | Cartmell | 208/161 |
| 4,176,083 | 11/1979 | McGovern et al. | 422/144 |
| 4,364,905 | 12/1982 | Fahrig et al. | 55/343 |
| 4,414,100 | 11/1983 | Krug et al. | 208/153 |

FOREIGN PATENT DOCUMENTS

| | | | |
|---|---|---|---|
| 317741 | 8/1929 | United Kingdom | 55/463 |
| 517206 | 1/1940 | United Kingdom | 55/457 |

OTHER PUBLICATIONS

Chemical Engineers' Handbook–4th ed., Perry, pp. 20-68, 20-69.

Primary Examiner—David L. Lacey
Attorney, Agent, or Firm—Jack H. Park; Kenneth R. Priem; Richard A. Morgan

[57] ABSTRACT

A separator apparatus has been invented which rapidly disengages catalyst from product vapor in the reactor discharge stream of a fluid catalytic cracking (FCC) apparatus. The separator apparatus comprises a flow diverter which comprises a frustum in which are spiral channels which induce a spin on the impacting stream and are sufficiently deep to contain a layer of catalyst. A position member is attached to the frustum base and apertures in the position member allow the flow of vapor to a bore and on to cyclone separators where final catalyst-vapor separation is made. Catalyst does not pass through the apertures and remains within a cylindrical separation chamber in flow communication with a dip leg which directs the catalyst to a stripper vessel in the fluid catalytic cracking apparatus. The separator apparatus is a solution to the vibration problem experienced in the use of rough-cut cyclones.

2 Claims, 5 Drawing Figures

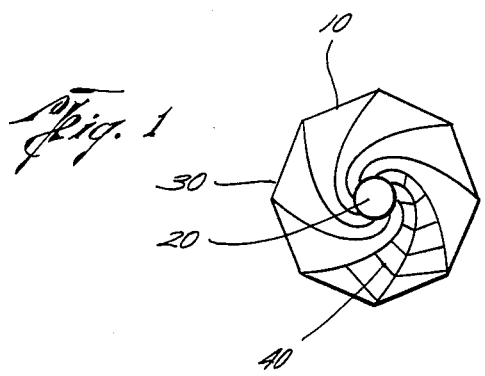
Fig. 1
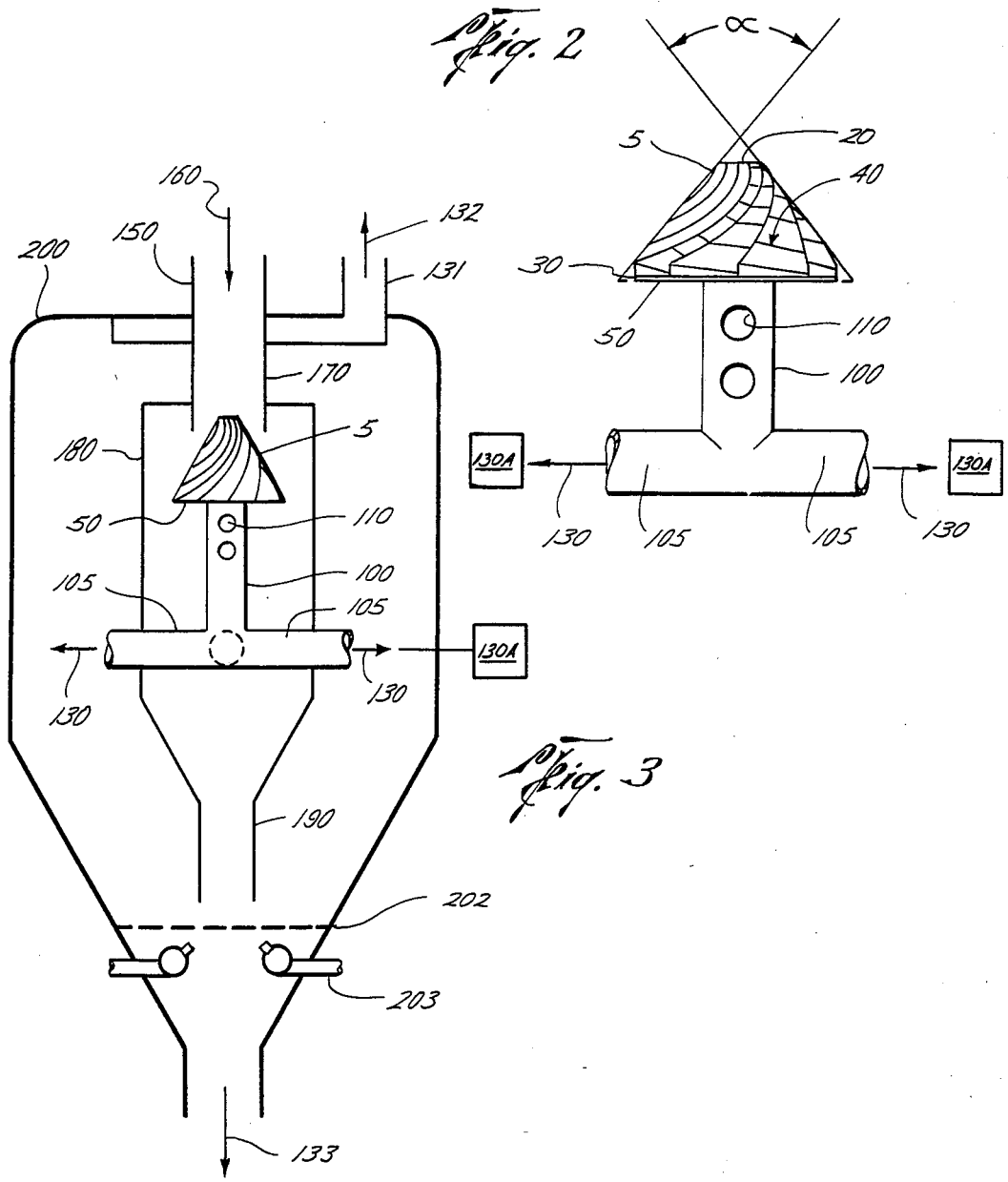
Fig. 2
Fig. 3

FCCU CATALYST-HIGH VELOCITY VAPOR SEPARATOR

BACKGROUND OF THE INVENTION

1. Field of the Invention

This invention relates to an apparatus for rapidly separating catalyst from vapor in the hot, high velocity reactor discharge in a fluid catalytic cracking process.

2. Prior Art

A number of fluid catalytic cracking (FCC) processes are known in the art. State of the art commercial catalytic cracking catalysts for these processes are highly active and possess high selectivity for conversion of selected hydrocarbon charge stocks to desired products. With such active catalysts it is generally preferable to conduct catalytic cracking reactions in a dilute phase transport type reaction system with a relatively short period of contact between the catalyst and the hydrocarbon feedstock, e.g. 0.2 to 10 seconds.

The control of short contact times, optimum for state of the art catalysts in dense phase fluidized bed reactors is not feasible. Consequently, catalytic cracking systems have been developed in which the primary cracking reaction is carried out in a transfer line reactor or riser reactor. In such systems, the catalyst is dispersed in the hydrocarbon feedstock and passed through an elongated reaction zone at relatively high velocity. In these transfer line reactor systems, vaporized hydrocarbon cracking feedstock acts as a carrier for the catalyst. In a typical upflow riser reactor, the hydrocarbon vapors move with sufficient velocity as to maintain the catalyst particles in suspension with a minimum of back mixing of the catalyst particles with the gaseous carrier. Thus development of improved fluid catalytic cracking catalysts has led to the development and utilization of reactors in which the reaction is carried out with the solid catalyst particles in a relatively dilute phase with the catalyst dispersed or suspended in hydrocarbon vapors undergoing reaction, e.g., cracking.

The cracking reactions are conveniently carried out in catalyst risers or transfer lines wherein the catalyst is moved from one vessel to another by the hydrocarbon vapors. Such reactors have become known in the art as risers or transfer line reactors. The catalyst and hydrocarbon mixture passes from the transfer line reactor into a first separation zone in which hydrocarbon vapors are separated from the catalyst. The catalyst particles are then passed into a second separation zone, usually a dense phase fluidized bed stripping zone wherein further separation of hydrocarbons from the catalyst takes place by stripping the catalyst with steam. After separation of hydrocarbons from the catalyst, the catalyst finally is introduced into a regeneration zone where carbonaceous residues are removed by burning with air or other oxygen-containing gas. After regeneration, hot catalyst from the regeneration zone is reintroduced into the transfer line reactor into contact with fresh hydrocarbon feed.

As stated, state of the art catalytic cracking catalysts are highly active. With the introduction of these highly active catalysts the first separation zone has become a limiting unit operation. When catalyst is not rapidly separated from vapor and the vapor quenched once the desired reactions have taken place, the cracking reactions will continue with the concomitant production of less desirable products. Rough-cut cyclones have been used as a first separation stage between catalyst and vapor, followed by finer cut cyclones to remove fines from the vapor.

Rough-cut cyclones have enjoyed only limited success. The first limitation on their success is size. FCCU debottle-necks have been limited by rough-cut cyclone size, which can become too large to be contained efficiently in the reactor vessel. The second limitation is that high throughput rough-cut cyclones experience pressure and/or velocity pulsations which destroy the cyclone vortex and thereby reduce cyclone efficiency. No cure for the pulsation problem has been found and many refiners have resorted to removing the rough-cut cyclones from their fluid catalytic cracking units while retaining the finer cut cyclones. Refiners have suffered an economic debit over that theoretically attainable by resorting to this modification, but it allows them to continue to operate the FCCU, which they could not do with a rough-cut cyclone subject to vortex destroying pulsations.

There exists an unfulfilled need in the art for a separator to disengage catalyst from vapor from a hot, high velocity stream, discharged from a fluid catalytic cracking reaction zone.

BRIEF DESCRIPTION OF THE DRAWINGS

FIG. 1 is a top view of the frustum.

FIG. 2 is a side view of the frustum showing the support and position member.

FIG. 3 is a typical apparatus arrangement.

DETAILED DESCRIPTION OF THE DRAWINGS

Figure 4:
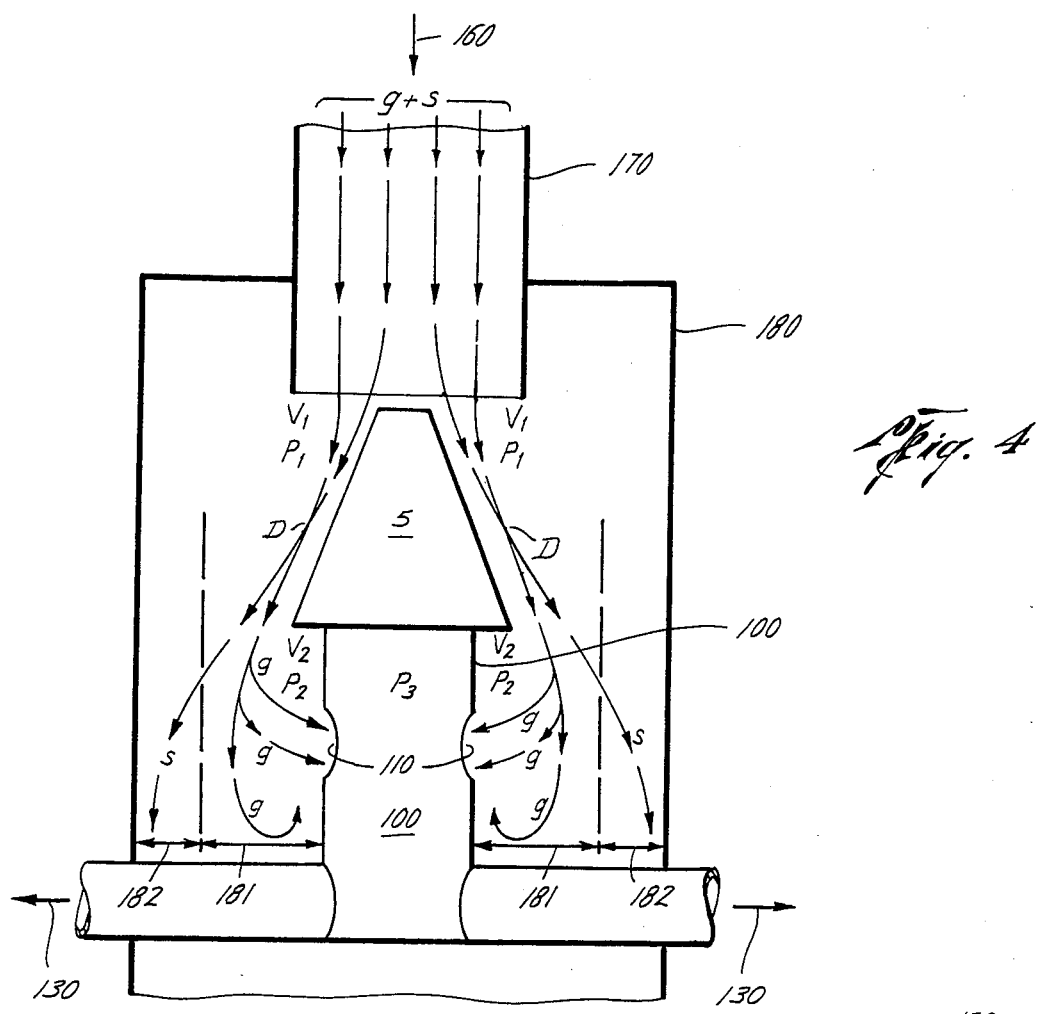
FIG. 4 is a cross-sectional view of the frustum, position member and support members.

In order to demonstrate and provide a better understanding of the invention, reference is made to the drawing. FIG. 1 is a schematic representation of the top view of the frustum. The frustum is formed from a right circular cone. On the face of the frustum are adjoining, equispaced spiral channels 10. There may be typically 6 to 20 channels, and preferably 8 to 12 channels. The channels 10 extend from the apex 20 to the intersection of the cone with the base (not shown) to form an edge 30. The channels 10 are sufficiently deep to hold a layer of catalyst and thereby protect the frustum from direct impingement by catalyst. The spiral shape of the channels serves to induce a spinning motion to reactor effluent directed thereon. This spin inducation is particularly useful for rapidly reestablishing a vortex which has been destroyed by pressure and/or velocity pulsations. Barriers 40 which in this drawing are flutes impede the catalyst from flowing from the apex 20 to the edge 30 along the channel 10 and off the frustum thereby protecting the frustum from erosion by direct impingement of catalyst. Tar and other carbonaceous matter (not shown) from the reactor outlet sticks to the frustum and also assists the barriers in impeding, though not necessarily preventing, the motion of catalyst within the channels. The barriers may alternately be groves, ripples, pegs, etc. Reactor discharge velocity is in the order of 75 ft/sec. or greater. In this environment, catalyst particles are rather gravity independent. The effect of this is that the channels 10 and barriers 40 will hold catalyst in place regardless of the spatial orientation of the frustum. Therefore the channels of a frustum with a horizontal axis of rotation will hold a catalyst level as will a frustum with a vertical axis of rotation.

FIG. 2 is a schematic side view of a typical frustum with support and position member. The apex angle is the angle of the cone from which the frustum 5 is taken. The apex angle cannot be greater than the angle of repose of a catalyst particle impinging thereon. With the angle thereby defined, essentially all the catalyst in the reactor discharge stream impinges upon catalyst particles in the channels, essentially none diverted around the edge 30 without being diverted by the frustum.

A position member 100 is attached to the base 50 and support members 105 for support inside the chamber 180 (not shown). Preferably there are 4 to 6 support members. In the position member 100 are apertures 110 through which vapor and catalyst fines 130 flow to a bore (not shown). Vapor and catalyst fines 130 flow through the bore and pass to cyclone separation means 130A for finally separating vapor from fines. Most preferably there are 4 support members and 4 cyclone separators.

FIG. 3 is a typical schematic representation of a down flow transfer line reactor and the separator apparatus. The transfer line reactor 150 contains a down flow catalytic cracking reaction zone (not shown). Reactor effluent 160 leaves the transfer line reactor 150 and enters tubular means 170. The longitudinal axis of tubular means 170 is preferably coincident with the axis of rotation of the frustum 5. Tubular means 170 is proximally located with the frustum 5 so that the entire reactor effluent 160 impacts the frustum 5. A separation chamber 180 is attached to the tubular means 170 and may have longitudinal axis coincident with or parallel to the longitudinal axis of tubular means 170. The separation chamber 180 contains the frustum 5 and is itself contained within a fluid catalytic cracking stripper vessel 200. Attached to the separation chamber 180 is dip leg 190 for the gravity assisted transport of catalyst from the separation chamber. Catalyst loses momentum from both impact with the frustum and subsequent spin induced travel within the tapered separation chamber. There is sufficient catalyst momentum to carry the catalyst from the frustum after impact through the chamber to dip leg 190, where the catalyst comes to rest at the surface of a level (not shown). This occurs whether the chamber arrangement is horizontal or vertical. Also since chamber 180 operates at a high pressure than chamber 200 no flapper valve or J valve is necessary or desired. Maintaining a stripper catalyst level above the end of the dip leg also assists in maintaining a level in the dip leg.

Product vapor travels around the frustum 5 and enters apertures 110 in the position member 100. Apertures 110 are located in the member 100 at the position of relative maximum pressure and relative minimum velocity so as to minimize the flow of catalyst into the bore (not shown) and into four fine cut cyclone separation means 130A. Catalyst and catalyst fines are separated from vapor in fine cut cyclone separation means 130A. Product vapor 132 leaves the stripper vessel 200 via duct 131 to which it has been flowed from fine cut cyclone separation means. Fines are autofluidized and flow to the catalyst level. Catalyst and fines 133 leave the bottom of the stripper vessel 200.

Below the level in this arrangement is a catalyst flow distribution plate 202 and header pipe and steam ring 203 which injects stripping steam. Catalyst and fines 133 flow to the spent catalyst standpipe (not shown).

FIG. 4 is a flow representation of the apparatus of the present invention. The transfer line reactor 150 (not shown) operates at a higher pressure than the separation chamber 180 which in turn operates at a higher pressure than the stripper chamber 200 (not shown). This pressure profile is required to achieve the proper flow scheme. The frustum 5 is aerodynamically designed such that the gases and solids are accelerated toward the wall of the separation chamber 180 from a velocity $V_1$ to a velocity $V_2$ with a corresponding drop in pressure from $P_1$ to $P_2$. The drop in pressure is analogous to that observed by an airfoil in the wing of an aeroplane. The paths taken by the vapor and solids are different due to the differences in controlling forces on each. A spin is induced on the vapor and solids as it passes the frustum. The vapor and solids are deflected toward the vessel wall by the frustum. Once past the frustum, the vapor diffuses toward the center of the separation chamber and follows a spiral flow pattern. The resulting vapor flow pattern is similar in all cyclone separation devices.

In FIG. 4 reactor effluent 160 is directed by tubular means 170 toward the frustum 5. In the figure, V is the velocity in the bulk phase of the zone. P is the pressure in the bulk phase of the zone. Subscript 1 indicates the zone upstream of the divergence zone. Subscript 2 indicates the zone downstream of the gas-solid divergence zone in the gas rich zone 181. Subscript 3 indicates the zone downstream of the gas-solid divergence zone inside the position member 100, after the gas has passed through aperture 110. D is the gas-solid divergence zone. g and s show respective flow directions for vapor and solids in the reactor effluent. g is a vapor flowline downstream of the divergence zone. s is a solids flowline downstream of the divergence zone.

Reactor effluent 160 is directed toward the frustum 5. A minor portion of the effluent 160 directly contacts the frustum 5 and an immediate separation of vapor and catalyst is made, the catalyst deflected toward the solids rich zone 182 at angles different from the direction of the vapor.

Reactor effluent 160 which does not directly impact the frustum 5 is deflected by the frustum shape and also induced to spin. This deflection and spin imparts an inertial force on the catalyst which forces it toward the solids rich zone 182 along flowline s. Vapor is also subject to inertial forces. However, once the vapor has passed the frustum 5, pressure forces control and the vapor follows the falling pressure gradient from $P_1$ to $P_2$ and then from $P_2$ through the aperture 110 to $P_3$.

The divergence zone D is the position relative to the frustum 5 wherein the bulk phase catalyst and vapor separate. Catalyst velocity and direction is primarily controlled by inertia toward the solids rich zone 182. Vapor is primarily controlled by pressure and follows flow lines g through the gas rich zone 181. The curved vapor flowlines demonstrate the resolution of inertial and pressure forces.

Figure 5:
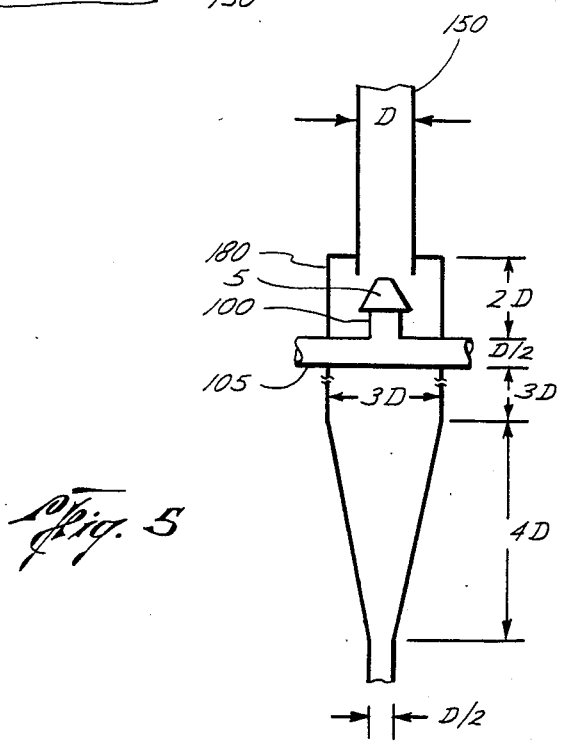
FIG. 5 is a cross-sectional view of the apparatus in proportion.

FIG. 5 is described in the Example.

SUMMARY OF THE INVENTION

The present invention is a separator apparatus which is used in a fluid catalytic cracking process for rapidly disengaging and separating catalyst and catalyst fines from cracked product vapor discharged from a down flow reaction zone. The apparatus comprises several elements, the first of which is the static, spin inducing outward flow diverter which is made from the frustum of a right circular cone. The apex angle of the right circular cone is less than the angle of repose of catalyst particles flowing from the reaction zone that impinge on the frustum. The frustum deflects the flowing vapors at obtuse angles to the normal while reducing the momentum of the impinging catalyst particles by impact. The momentum is further reduced in a surrounding cylindrical separation chamber.

Into the frustum are positioned adjoining equispaced spiral channels extending form the apex of the frustum to the intersection of the frustum with the base. The spiral channels impart a spin and outward direction to the high velocity flow stream impinging on the frustum. The channels are sufficiently deep to contain a layer of catalyst at least one centimeter deep. This layer of catalyst protects the frustum from direct, high velocity impingement by catalyst particles in the flowing stream. In the channels are barriers which retard the flow of catalyst along the channels.

The frustum has a base to which is attached a support member and position members. Apertures in the members allow vapor and catalyst fines to flow therethrough to a bore and on to fine cut cyclone separators to separate cracked product vapor from catalyst fines.

Tubular means of radius less than or equal to that of the radius of the cone base directs the entire flow of high velocity flow toward the frustum.

A tapered separation chamber is attached to tubular means. The frustum is positioned in the chamber. Catalyst looses additional momentum in the chamber and catalyst is finally disengaged from vapor in a dip leg to which catalyst is transported by gravity flow. Dip leg contains a catalyst level to seal the dip leg from vapor flow.

EXAMPLE

Reference is made to FIG. 5 by way of example. FIG. 5 is a proportional representation of one embodiment of the present invention showing lateral outward vapor flow from the separation chamber.

Tubular means 150 is of diameter D typically 12 to 60 inches. The frustum 5 is diameter 1.1D at the base. The axis of rotation of the frustum 5 is coincident with the longitudinal axis of tubular means 150 and the cylindrical separation chamber 180 of diameter 3D at the widest and D/2 at the narrowest. Position member 100 is of diameter D and attached to four equispaced support members 105 each of diameter D/2. To each support member 105 is attached a fine cut cyclone (not shown).

The frustum 5 is positioned such that the end of tubular means 150 is a distance D/2 from the edge 30. The distance D/2 is the minimum for this distance for passage of all vapor through tubular means 150 to the chamber 180 without excessive pressure drop.

The chamber 180 is 9.5D long. In the constant diameter portion is positioned the frustum 5. This portion is 5.5D long. A tapered portion is 4D long. The chamber 180 is contained within a stripper vessel 200 (not shown) of diameter 6D. Velocity within tubular means is typically 30 to 100 ft/sec. and drops to 1 to 3 ft/sec. in the stripper vessel.

What is claimed is:
1. In a fluid catalytic cracking apparatus a separator apparatus for rapidly disengaging and separating catalyst and catalyst fines from cracked product vapor discharged from a down flow reaction zone in the fluid catalytic cracking apparatus, the separator apparatus comprising:
 (1) a static, spin inducing outward flow diverter consisting of a right circular conical member with a base comprising:
   (a) a frustum into which are positioned adjoining equispaced spiral channels extending from the apex of the frustum to the intersection of the frustum with the base, which spiral channels impose a spin and outward direction on the high velocity flow stream impinging thereon, the channels being sufficiently deep to contain a layer of catalyst at least one centimeter deep which layer of catalyst protects the diverter from direct, high velocity impingement by catalyst particles in the flowing stream, and in the channels, barriers which retard the flow of catalyst along the channels,
   (b) an apex angle of the frustum being less than the angle of repose of the catalyst particles impinging on the frustum, thereby deflecting the flowing vapors at obtuse angles to the normal while reducing the momentum of the impinging catalyst particles by impact on the layer of catalyst and thereby reducing the velocity of impinging catalyst particles below that of the flowing vapor,
 (2) a position member attached to the base in which position member are apertures through which the vapor and catalyst fines pass to a bore,
 (3) support members which support the position member and in which is the continuation of the bore for passage of vapor and catalyst fines therethrough,
 (4) cyclone separators in flow communication with the bore which receive vapor and catalyst fines from the bore in support members and which cyclone separators separate vapor from catalyst fines,
 (5) tubular means in flow communication with the reaction zone which by proximity directs the entire high velocity flow stream toward the frustum at right angles to the plane of the base, and of radius less than or equal to the radius of the base,
 (6) a cylindrical separation chamber attached to the tubular means and in which is positioned the static, spin inducing outward flow diverter, the position member and the support members and in which catalyst looses additional momentum,
 (7) a dip leg in flow communication with the separation chamber for gravitationally transporting catalyst from the separation chamber to a stripper vessel of the fluid catalytic cracking apparatus.
2. The apparatus of claim 1 wherein the frustum includes 8 to 12 of said channels.

* * * * *